(12) United States Patent
Ko et al.

(10) Patent No.: US 12,300,860 B2
(45) Date of Patent: May 13, 2025

(54) SEPARATOR UNIT FOR FUEL CELL AND UNIT CELL FOR FUEL CELL INCLUDING SAME

(71) Applicants: Hyundai Motor Company, Seoul (KR); Kia Corporation, Seoul (KR)

(72) Inventors: Han Gil Ko, Yongin-Si (KR); Kyung Min Kim, Namyangju-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 441 days.

(21) Appl. No.: 17/869,347

(22) Filed: Jul. 20, 2022

(65) Prior Publication Data

US 2023/0197985 A1 Jun. 22, 2023

(30) Foreign Application Priority Data

Dec. 22, 2021 (KR) .................. 10-2021-0185244

(51) Int. Cl.
    *H01M 8/04* (2016.01)
    *H01M 8/0265* (2016.01)
    *H01M 8/0276* (2016.01)
    *H01M 8/04089* (2016.01)
    *H01M 8/2485* (2016.01)

(52) U.S. Cl.
    CPC ..... *H01M 8/04097* (2013.01); *H01M 8/0265* (2013.01); *H01M 8/0276* (2013.01); *H01M 8/2485* (2013.01)

(58) Field of Classification Search
CPC .......... H01M 8/04097; H01M 8/0265; H01M 8/0276; H01M 8/2485
See application file for complete search history.

(56) References Cited

U.S. PATENT DOCUMENTS

2012/0129072 A1* 5/2012 Kim .................. H01M 8/0267
429/514

FOREIGN PATENT DOCUMENTS

JP      5482991      5/2014

\* cited by examiner

*Primary Examiner* — Olatunji A Godo
(74) *Attorney, Agent, or Firm* — Morgan, Lewis & Bockius LLP

(57) ABSTRACT

A separator unit for a fuel cell includes a separator including a reaction region, a plurality of manifolds formed on each side of the reaction region, and a reaction surface and a cooling surface formed on each surface thereof, a reaction surface internal gasket forming a reaction surface internal airtight line, and a reaction surface external gasket forming a reaction surface external airtight line, wherein at least one cut portion formed by removing the reaction surface external gasket is formed in the reaction surface external airtight line surrounding at least one of the plurality of manifolds.

20 Claims, 12 Drawing Sheets

SEPARATOR UNIT FOR FUEL CELL AND UNIT CELL FOR FUEL CELL INCLUDING SAME

CROSS REFERENCE TO RELATED APPLICATION

The present application claims priority to Korean Patent Application No. 10-2021-0185244, filed Dec. 22, 2021, the entire contents of which is incorporated herein for all purposes by this reference.

BACKGROUND OF THE PRESENT DISCLOSURE

Field of the Present Disclosure

The present disclosure relates to a separator unit of a fuel cell and a unit cell for a fuel cell including the same, and more particularly, to a separator unit of a fuel cell and a unit cell for a fuel cell including the same, which can prevent generated water from being accumulated between an internal airtight line and an external airtight line by removing a portion of a gasket forming the external airtight line.

Description of Related Art

A fuel cell is a type of power generation device that converts chemical energy of a fuel into electrical energy through an electrochemical reaction in a stack. Fuel cells may be used not only to supply electric power for industrial and household use and driving power for vehicles, but also to power small electronic products such as portable devices, and recently the area of use of fuel cells as a high efficiency clean energy source has been gradually expanded.

FIG. 1 is a view showing the configuration of a typical fuel cell stack.

As may be seen in FIG. 1, in a unit cell forming a typical fuel cell stack, a membrane electrode assembly (MEA) is located at the innermost side, and the membrane electrode assembly 10 is composed of a polymer electrolyte membrane 11 capable of moving hydrogen cations (protons) and a catalyst layer coated on both sides, a fuel electrode anode 12 and an air electrode cathode 13, of the electrolyte membrane so that hydrogen and oxygen can react.

Furthermore, a pair of gas diffusion layers (GDL) 20 are stacked on the external portion of the membrane electrode assembly 10, that is, on the external portion where the fuel electrode 12 and the air electrode 13 are located, and a separator assembly 30 having a flow field formed therein to supply fuel and discharge water generated by the reaction is positioned outside the gas diffusion layer 20 with a gasket line 40 interposed therebetween.

Here, the separator assembly 30 is formed by bonding an anode separator 31 provided on the anode and a cathode separator 32 provided on the cathode while facing each other.

Meanwhile, a fuel cell stack is formed by stacking a plurality of unit cells, and an end plate 50 for supporting and fixing each of the above-described components is coupled to the outermost side of the stacked unit cells.

Here, the anode separator 31 provided in any one unit cell is stacked to face the cathode separator 32 of another unit cell provided adjacent to the formerly mentioned unit cell.

Accordingly, the separator assembly 30, in which the cathode separator 32 and the anode separator 31 of adjacent unit cells provided to face each other are integrated, is used to construct a unit cell to smoothly perform the stacking process of the unit cells and maintain the alignment of the unit cells.

Here, the anode separator 31 and the cathode separator 32 forming the separator assembly 30 are bonded and integrated, so that manifolds communicate with each other, and each reaction region is configured in a similar shape to be provided at the same position.

Meanwhile, in the separator assembly 30, the plurality of manifolds and the reaction regions are spaces in which reactant gas or cooling water is introduced, discharged, or flows, and an airtight line is formed by the gasket 40 along the circumference of the plurality of manifolds and the reaction regions for airtightness.

In general, the airtight line is formed by injecting a rubber gasket 40 to a predetermined thickness on the surface of at least one of the anode separator 31 and the cathode separator 32.

For example, recently, the gasket 40 is not formed on the anode separator 31 but is formed in various forms on a cathode reaction surface and a cathode cooling surface of the cathode separator 32 for the convenience of the process.

FIG. 2A is a view showing an anode separator forming a typical fuel cell stack, and FIG. 2B is a view showing a cathode reaction surface of a cathode separator forming a typical fuel cell stack, and FIG. 2C is a view showing a cathode cooling surface of a cathode separator forming a typical fuel cell stack.

An anode separator forming a typical fuel cell stack as shown in FIG. 2A has an anode reaction region 1a in which a flow field through which hydrogen flows is formed in the central region, and a plurality of manifolds 1b are formed on both sides of the anode reaction region 1a. Here, six manifolds 1b are provided, and hydrogen, air, or cooling water is introduced or discharged through each manifold.

A hydrogen flow channel 31a for introducing hydrogen flowing through a hydrogen intake manifold 1b' into the anode reaction region 1a is formed between the hydrogen intake manifold 1b', through which hydrogen is introduced among the plurality of manifolds 1b formed on the anode separator 31, and the anode reaction region 1a.

Here, a plurality of hydrogen flow channels 31a are formed to protrude from the anode separator 31 and penetrate in the direction of the anode reaction surface. Furthermore, a plurality of support protrusions 31b formed to protrude from the anode separator 31 in the direction of the anode reaction surface may be formed at points spaced from each of the hydrogen inflow passages 31a with a predetermined distance. Thus, when the fuel cell stack is stacked, the frame (hereinafter referred to as "sub-gasket 14") surrounding and supporting the membrane electrode assembly 10 is brought into contact with the plurality of hydrogen flow channels 31a and support protrusions 31b that are formed by protruding from the anode separator 31, and supported.

In the present way, the sub-gasket 14 is stacked between the anode separator 31 and the cathode separator 32 to form a unit cell.

Furthermore, a gasket forming an airtight line is not formed on the anode separator 31.

Meanwhile, the cathode separator 32 forming the typical fuel cell stack as shown in FIGS. 2B and 2C also has an cathode reaction region 2a in which a flow field through which air flows is formed in the central region, and a plurality of manifolds 2b are formed on both sides of the cathode reaction region 2a. Here, also six manifolds 2b are provided, and hydrogen, air, or cooling water is introduced or discharged through each manifold.

An air flow channel 32a for introducing air flowing through an air intake manifold 2b' into the cathode reaction region 2a is formed between the air intake manifold 2b', through which air is introduced among the plurality of manifolds 2b formed on the cathode separator 32, and the cathode reaction region 2a.

Meanwhile, various types of gasket lines 40 are formed in the cathode separator 32 to maintain airtightness while forming a flow path through which hydrogen, air, or cooling water flows.

For example, as shown in FIG. 2B, on the cathode reaction surface of the cathode separator 32, an external airtight line 41 to which the anode separator 31 is in contact while surrounding the plurality of manifolds 2b and the cathode reaction region 2a is formed. Accordingly, an internal airtight line 42 to which the sub-gasket 14 is in contact while surrounding the cathode reaction region 2a and securing a path through which air is introduced is formed. A separator in which the external airtight line 41 to which the anode separator 31 is in contact and the internal airtight line 42 to which the sub-gasket 14 is in contact are formed together on the cathode reaction surface of the cathode separator 32 is generally referred to as a "dual gasket type separator".

Furthermore, as shown in FIG. 2C, on the cathode cooling surface of the cathode separator 32, an airtight line 40b is formed which is in contact with the anode separator 31 while securing a path through which cooling water flows and a path through which air flows.

Meanwhile, FIG. 3 is a view showing a unit cell forming a typical fuel cell stack.

As shown in FIG. 3, in the unit cell forming the typical fuel cell stack, an electricity-generating assembly (EGA) 21 in which the membrane electrode assembly 10, the sub-gasket 14, and the gas diffusion layer 20 are combined is stacked between the anode reaction surface of the anode separator 31 and the cathode reaction surface of the cathode separator 32. Here, each side of the EGA 21 is provided in the anode reaction region 1a of the anode separator 31 and the cathode reaction region 2a of the cathode separator 32, respectively.

Here, the cathode cooling surface of the cathode separator 32 is stacked to be opposed to the anode cooling surface of the anode separator 31 forming the adjacent unit cell.

FIG. 4 is a view showing the stacked state of the unit cells along the line A-A of FIGS. 2B and 2C. As can be seen in FIG. 4, in the case of the cathode separator 32, a closed space between the external airtight line 41 and the internal airtight line 42 is inevitably generated.

Thus, when a reactant gas supplied during operation of the fuel cell stack or water generated by the reaction of the reactant gas enters the closed space between the external airtight line 41 and the internal airtight line 42, this gas or generated water stagnates inside and cannot be discharged to the outside, which is problematic.

The generated water which is abnormally stagnant and cannot be discharged to the outside causes problems such as corrosion of the separators and deterioration of the physical properties of the gasket.

Also, in winter, the generated water that has not been discharged may freeze and cause airtight defects, which may cause a problem of reduced durability of the fuel cell stack.

Furthermore, during an airtight inspection of the fuel cell stack, test gas is injected into the stack, and as the gas is filled up to the closed space between the external airtight line and the internal airtight line, a pressure drop of the test gas occurs, which causes an error in the judgment of the airtight inspection or a problem of delaying the inspection time.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a separator unit of a fuel cell and a unit cell for a fuel cell including the same, which can prevent generated water from being accumulated between an internal airtight line and an external airtight line by removing a portion of a gasket forming the external airtight line.

The objective of the present disclosure is not limited to the above-mentioned objective, and other different objectives not mentioned herein will be clearly understood by those skilled in the art from the description of the present disclosure.

In various aspects of the present disclosure, according to various exemplary embodiments of the present disclosure, there is provided a separator unit used in a unit cell for a fuel cell, the separator unit for a fuel cell including: a separator including a reaction region formed in the center portion thereof, a plurality of manifolds formed on each side of the reaction region through which reactant gas or cooling water is introduced or discharged, and a reaction surface formed on a first surface thereof and a cooling surface formed on a second surface thereof; a reaction surface internal gasket formed on the reaction surface of the separator, and surrounding the reaction region and forming a reaction surface internal airtight line while securing a path through which the reactant gas is introduced or discharged; and a reaction surface external gasket formed on the reaction surface of the separator, and forming a reaction surface external airtight line while surrounding the reaction surface internal gasket and the plurality of manifolds, wherein at least one cut portion formed by removing the reaction surface external gasket is on a portion of the reaction surface external airtight line surrounding at least one of the plurality of manifolds.

The at least a cut portion may be formed in the reaction surface external airtight line surrounding a manifold through which the reactant gas is introduced or discharged among the plurality of manifolds.

The at least a cut portion may be formed in the lower region, based on the direction of gravity, of the reaction surface external airtight line surrounding the manifold through which the reactant gas is introduced or discharged.

The at least a cut portion may be formed by completely removing the reaction surface external gasket at a predetermined point in the reaction surface external airtight line.

The at least a cut portion may be formed by removing a portion of the reaction surface external gasket at a predetermined point in the reaction surface external airtight line.

The separator unit for a fuel cell may further include a cooling surface gasket formed on the cooling surface of the separator, surrounding a region corresponding to the reaction region and the plurality of manifolds, and forming a cooling surface airtight line while securing a path through which the cooling water is introduced or discharged.

The at least a cut portion may be formed at a point where, in the reaction surface external airtight line, the cooling surface gasket is not formed is projected.

A membrane electrode assembly and a sub-gasket for surrounding and supporting an edge portion of the membrane electrode assembly may be provided on the reaction region of the separator, and the reaction surface internal gasket may be in contact with the sub-gasket to form the reaction surface internal airtight line.

Meanwhile, a unit cell for a fuel cell according to various exemplary embodiments of the present disclosure includes: a membrane electrode assembly (MEA); a pair of gas diffusion layers (GDL) provided on each side of the MEA; a cathode separator provided outside the GDL provided on a first surface of the MEA, including a cathode reaction region formed in a center portion thereof, including a plurality of manifolds formed on each side of the cathode reaction region through which reactant gas or cooling water is introduced or discharged, and including a cathode reaction surface through which air flows formed on a surface facing the GDL and a cathode cooling surface through which cooling water flows formed on a surface opposite to the surface facing the GDL; an anode separator provided outside the GDL provided on a second surface of the MEA, including an anode reaction region formed in a center portion thereof, including a plurality of manifolds formed on each side of the anode reaction region through which reactant gas or cooling water is introduced or discharged, and including an anode reaction surface through which hydrogen flows formed on a surface facing the GDL and an anode cooling surface through which cooling water flows formed on a surface opposite to the surface facing the GDL; a reaction surface internal gasket formed on the cathode reaction surface of the cathode separator, and surrounding the cathode reaction region and forming a reaction surface internal airtight line while securing a path through which the reactant gas is introduced or discharged; and a reaction surface external gasket formed on the cathode reaction surface of the cathode separator, and forming a reaction surface external airtight line between the cathode separator and the anode separator while surrounding the reaction surface internal gasket and the plurality of manifolds, wherein at least one cut portion formed by removing the reaction surface external gasket is on a portion of the reaction surface external airtight line surrounding at least one of the plurality of manifolds.

The at least a cut portion may be formed in the reaction surface external airtight line surrounding the manifold through which hydrogen is introduced or discharged among the plurality of manifolds.

The at least a cut portion may be formed in a lower region, based on a direction of gravity, of the reaction surface external airtight line surrounding the manifold through which the hydrogen is introduced or discharged.

The at least a cut portion may be formed by completely removing the reaction surface external gasket at a predetermined point in the reaction surface external airtight line.

The at least a cut portion may be formed by removing a portion of the reaction surface external gasket at a predetermined point in the reaction surface external airtight line.

The at least a cut portion may be formed to be greater than ½ of a gap between the cathode reaction surface of the cathode separator and the anode reaction surface of the anode separator.

The unit cell for a fuel cell may further include a cooling surface gasket formed on the cathode cooling surface of the cathode separator, surrounding a region corresponding to the cathode reaction region and the plurality of manifolds, and forming a cooling surface airtight line while securing a path through which the cooling water is introduced or discharged.

The at least a cut portion may be formed at a point where, in the reaction surface external airtight line, the cooling surface gasket is not formed is projected.

A plurality of cut portions may be formed, and a gasket island portion may be formed in the reaction surface external airtight line by a formation of the plurality of cut portions, wherein the gasket island portion may be formed at a point where, in the reaction surface external airtight line, the cooling surface gasket is formed is projected.

The unit cell for a fuel cell may further include a sub-gasket surrounding and supporting the edge portion of the MEA, wherein the reaction surface internal gasket is in contact with the sub-gasket to form the reaction surface internal airtight line.

According to exemplary embodiments of the present disclosure, it is possible to prevent reactant gas and generated water from remaining and stagnating between the external airtight line and the internal airtight line by forming a cut portion formed by removing a portion of the external airtight line to prevent the space between the internal airtight line and the external airtight line from being closed.

Accordingly, it is possible to prevent the generated water from being undesirably stagnant, and thus prevent the separators from being corroded or the physical properties of the gasket from being deteriorated by the generated water, improving the durability of the fuel cell stack.

Furthermore, it is possible to prevent the generated water from freezing at an unwanted location in winter and prevent the separators from being damaged or deformed due to the freezing of the generated water, improving the durability of the fuel cell stack.

Also, it may be expected that an airtight inspection of fuel cell stacks will be performed rapidly.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
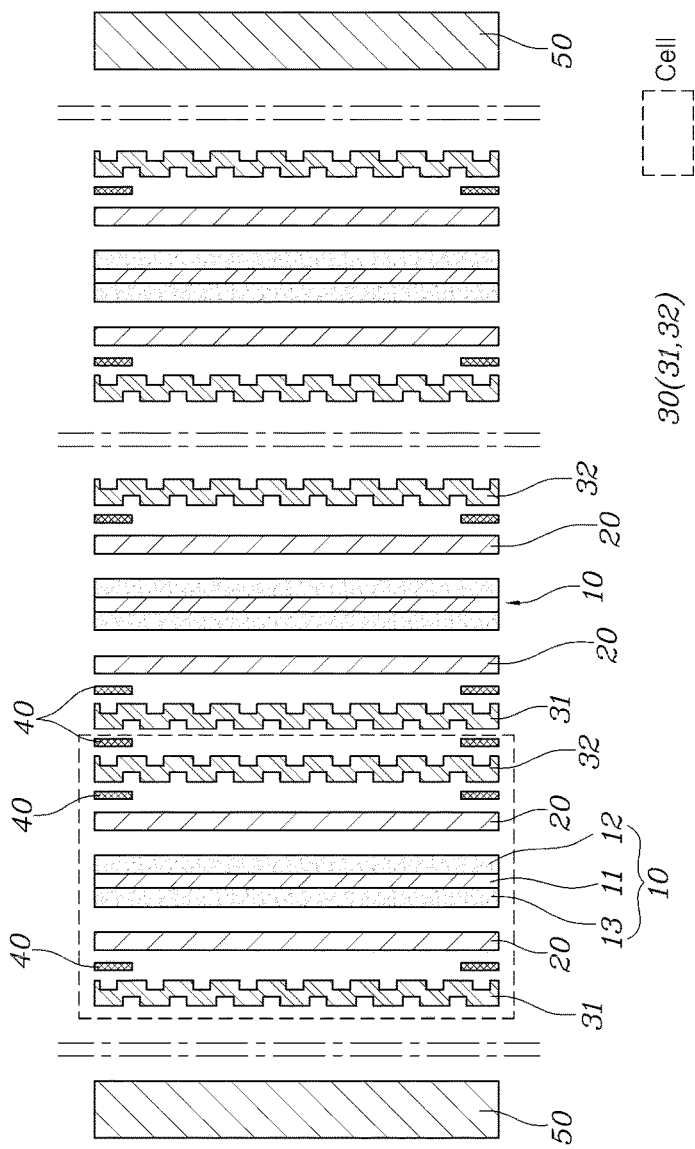
FIG. 1 is a view showing the configuration of a typical fuel cell stack.
Figure 2A:
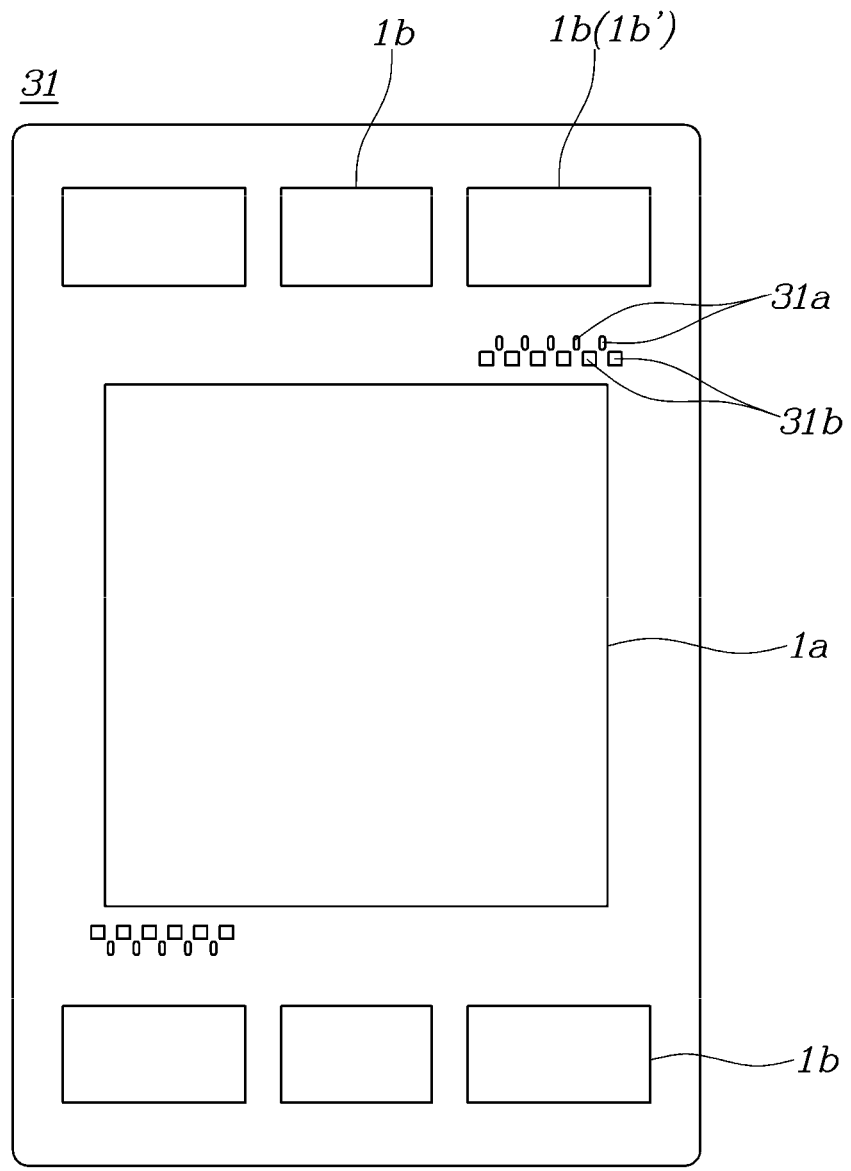
FIG. 2A is a view showing an anode separator forming the typical fuel cell stack.
Figure 2B:
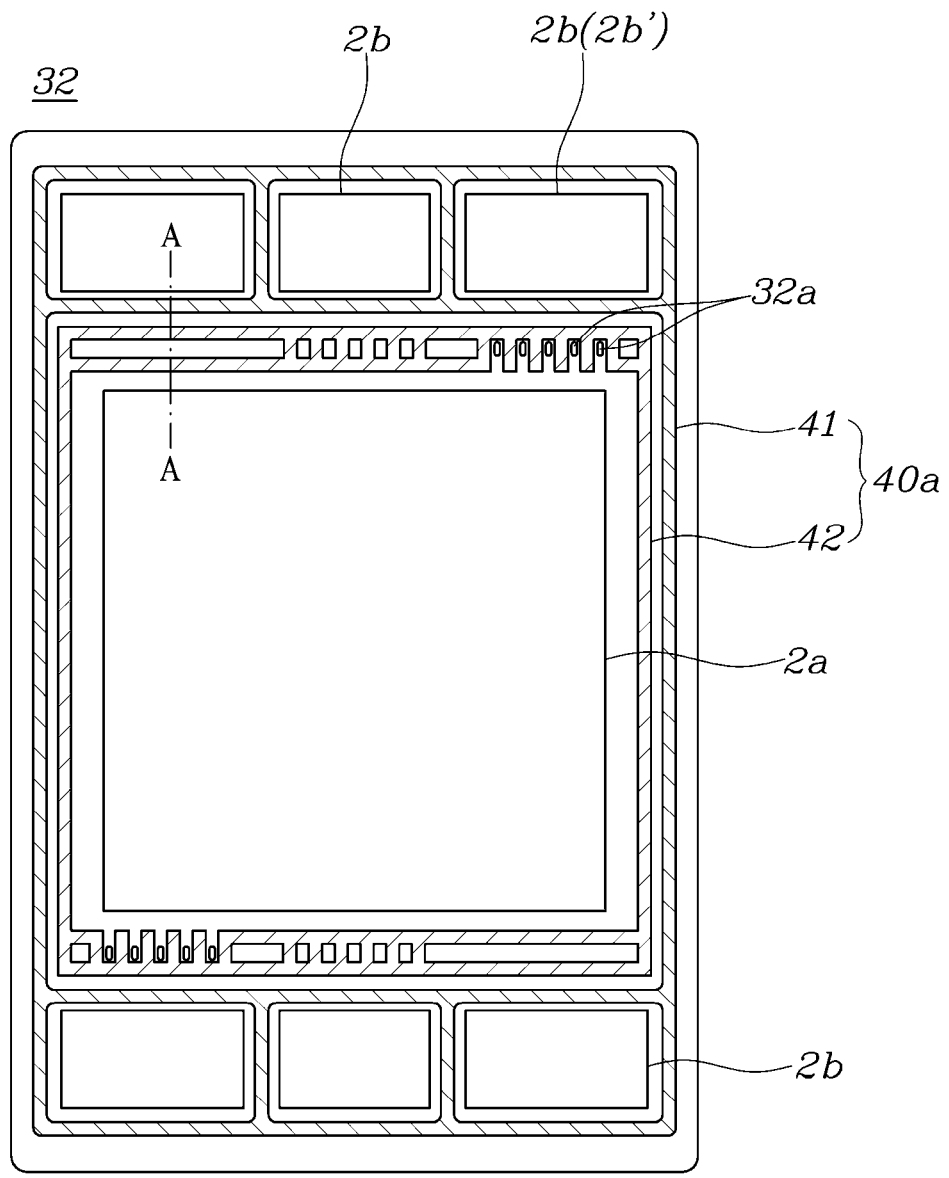
FIG. 2B is a view showing a cathode reaction surface of a cathode separator forming the typical fuel cell stack.
Figure 2C:
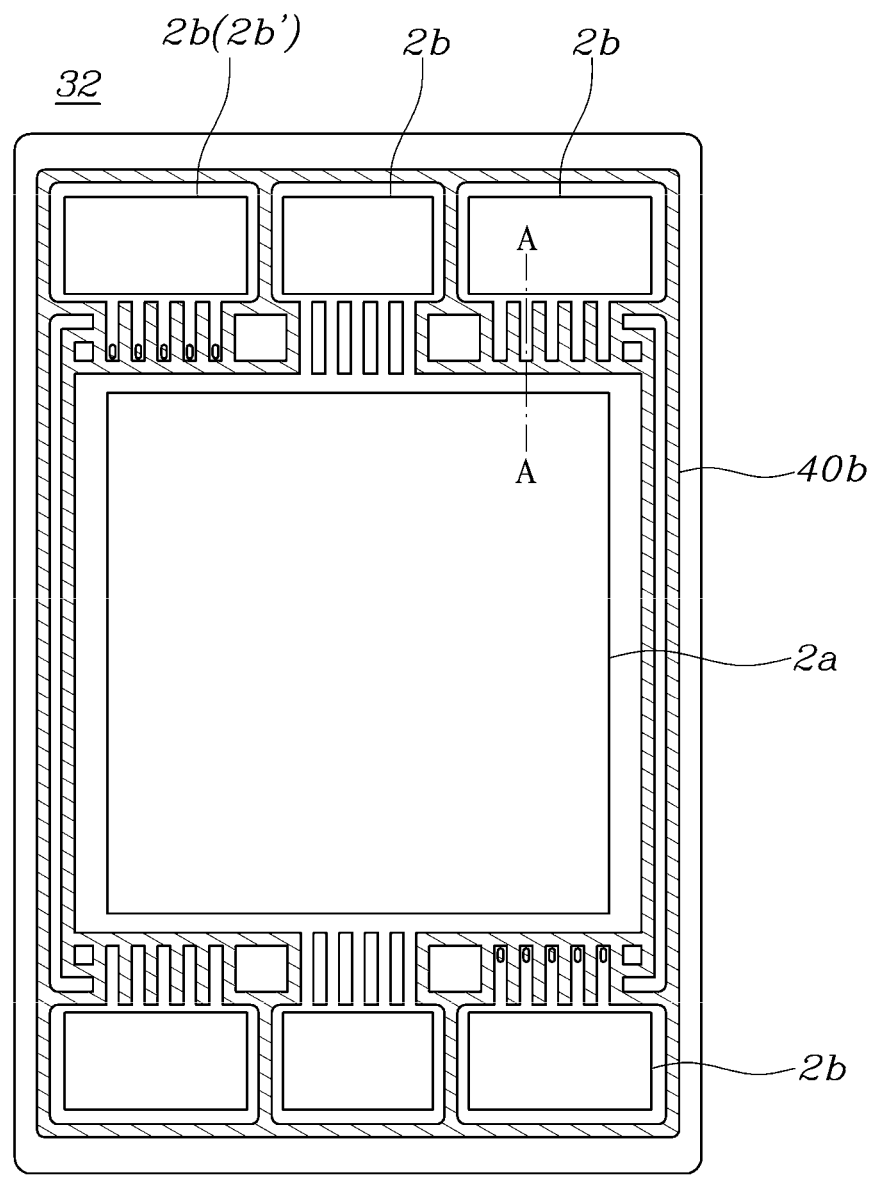
FIG. 2C is a view showing a cathode cooling surface of the cathode separator forming the typical fuel cell stack.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, exemplary embodiments of the present disclosure will be described in detail with reference to the accompanying drawings. However, the present disclosure is not limited to the exemplary embodiments included below, but will be implemented in various different forms, and these embodiments are provided so that the present disclosure of the present disclosure is complete, and to fully inform those of ordinary skill the scope of the present disclosure. In the drawings, the same reference numerals refer to the same elements.

Figure 3:
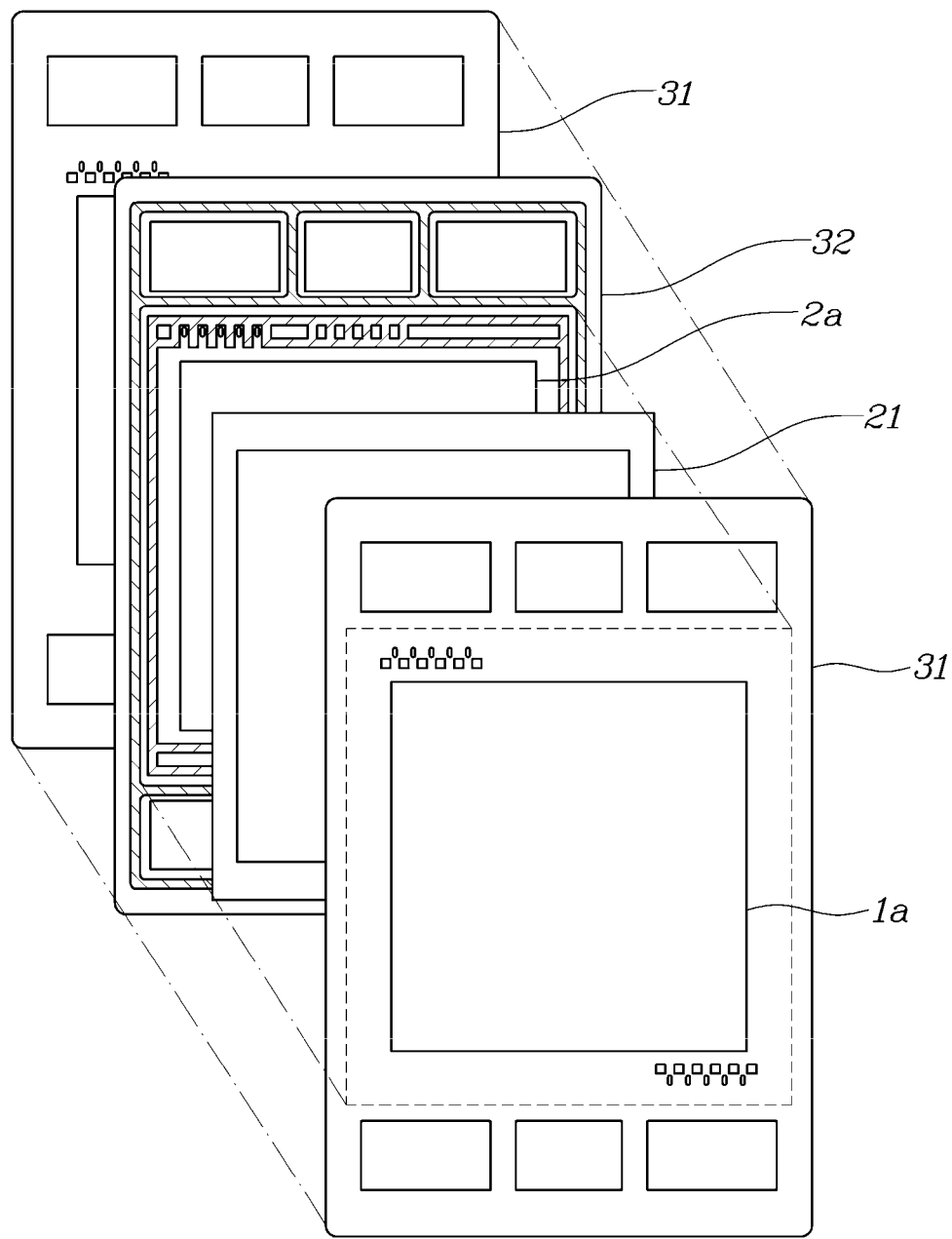
FIG. 3 is a view showing a unit cell forming the typical fuel cell stack.
Figure 4:
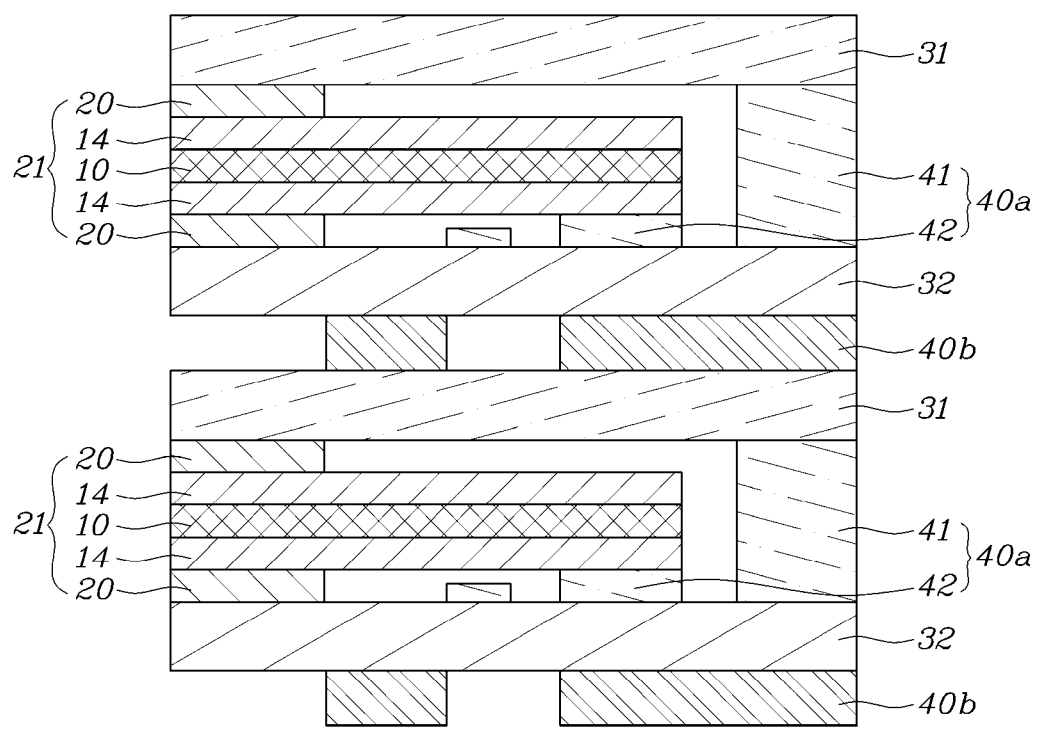
FIG. 4 is a view showing the stacked state of the unit cells along the line A-A of FIGS. 2B and 2C.

A unit cell for a fuel cell according to various exemplary embodiments of the present disclosure maintains the configuration of the unit cell forming the typical fuel cell stack shown in FIGS. 1 and 3 as it is, while a portion of a gasket forming an external airtight line on a cathode separator is removed to prevent the unreacted reactant gas and generated water from remaining between the external airtight line and an internal airtight line.

Figure 6:
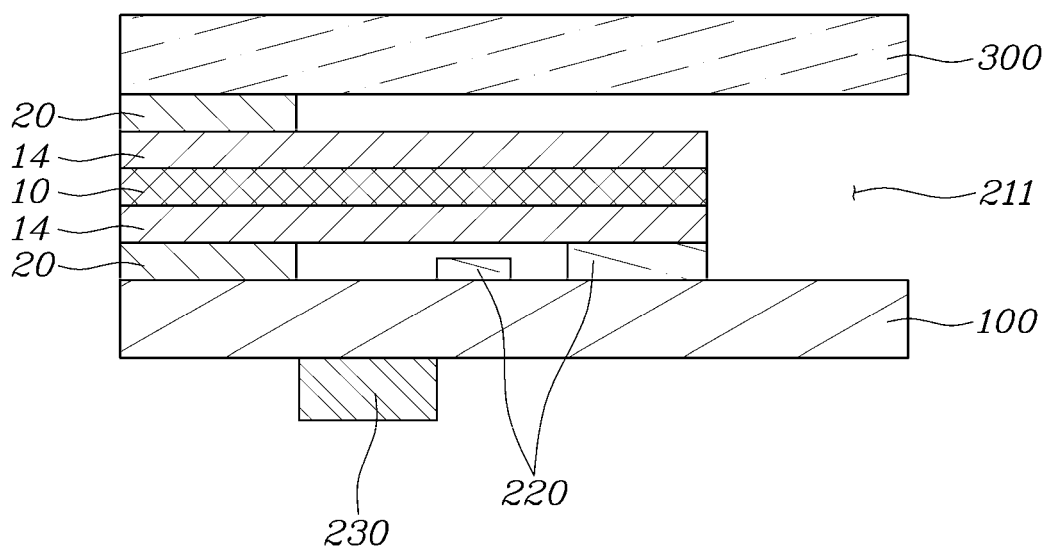
FIG. 6 is a view showing the stacked state of the unit cells along the line B-B in FIG. 5A and FIG. 5B.

Like the conventional unit cell for a fuel cell, the unit cell for a fuel cell according to the exemplary embodiment of the present disclosure includes a membrane electrode assembly 10, a gas diffusion layer 20, an anode separator 300, and a cathode separator 100 as shown in FIG. 6. Here, a frame for surrounding and supporting the membrane electrode assembly 10 may be further provided, and the present frame is referred to as a sub-gasket 14.

Thus, the membrane electrode assembly 10, the sub-gasket 14, and the gas diffusion layer 20 are provided between a reaction surface of the anode separator 300 and a reaction surface of the cathode separator 100.

Here, a reaction surface external gasket 210 and a reaction surface internal gasket 220 are injected on the cathode reaction surface of the cathode separator 100 to form a reaction surface external airtight line and a reaction surface internal airtight line, and a cooling surface gasket 230 is injected on a cathode cooling surface of the cathode separator 100 to form a cooling surface airtight line.

A plurality of unit cells are connected in series to form a fuel cell stack.

Thus, the anode separator 300 configured in one unit cell is provided to face the cathode separator 100 configured in the unit cell adjacent thereto.

Therefore, in the following description, a redundant description of the unit cell for a typical fuel cell stack will be omitted.

Figure 5A:
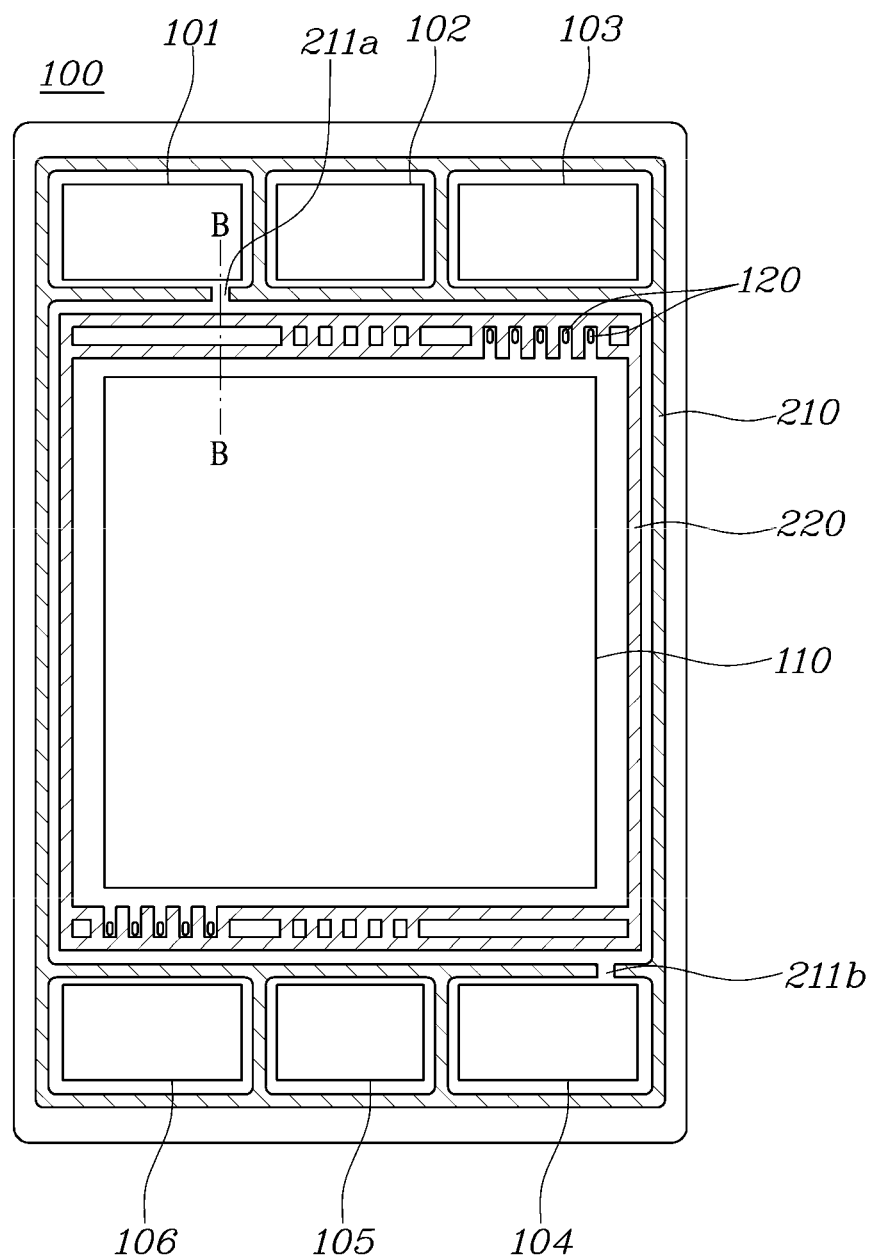
FIG. 5A is a view showing a reaction surface of a separator unit for a fuel cell according to various exemplary embodiments of the present disclosure.
Figure 5B:
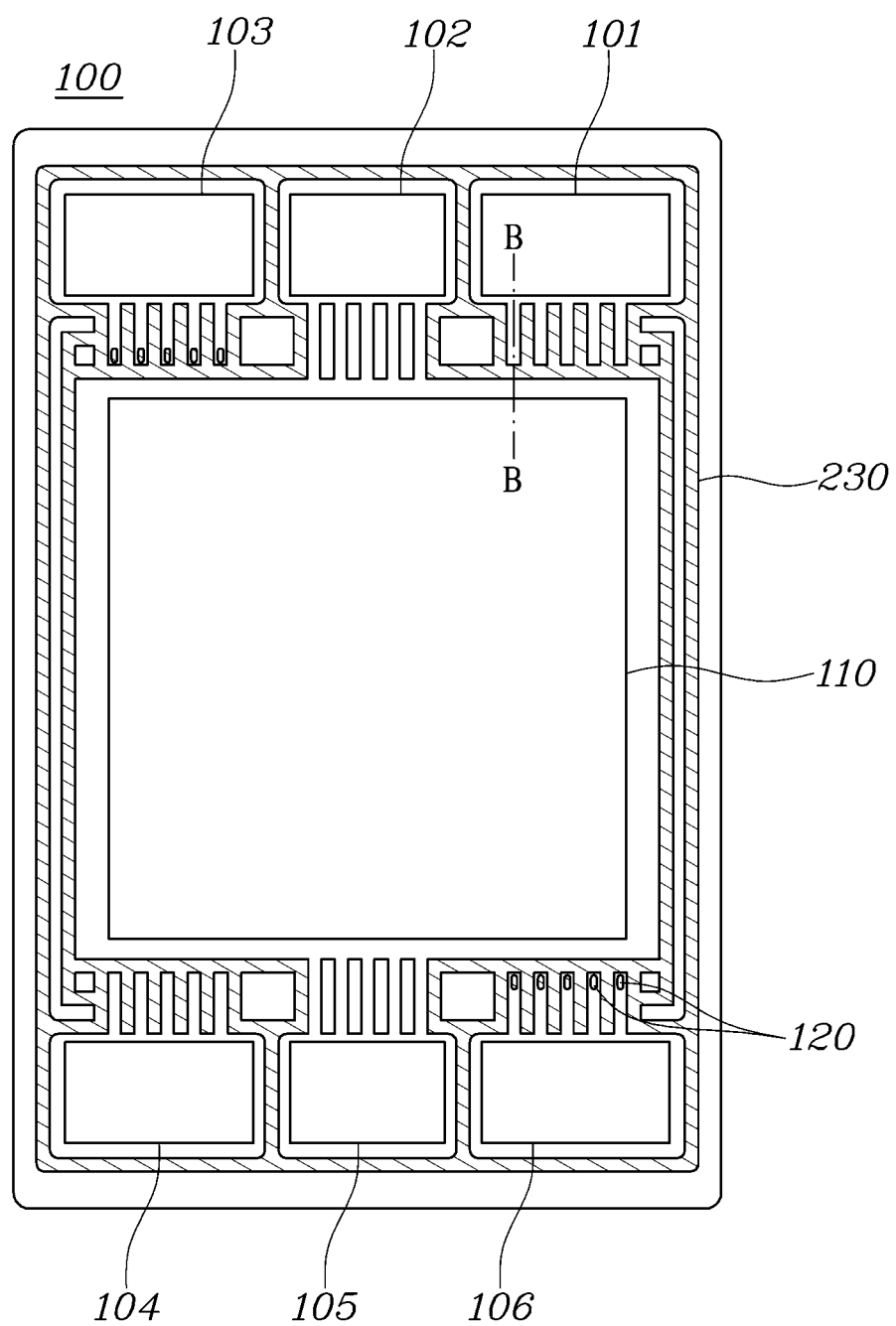
FIG. 5B is a view showing a cooling surface of the separator unit for a fuel cell according to the exemplary embodiment of the present disclosure.

FIG. 5A is a view showing a reaction surface of a separator unit for a fuel cell according to various exemplary embodiments of the present disclosure, FIG. 5B is a view showing a cooling surface of a separator unit for a fuel cell according to the exemplary embodiment of the present disclosure, and FIG. 6 is a view showing the stacked state of the unit cells along the line B-B in FIG. 5A and FIG. 5B.

A separator unit for a fuel cell according to the exemplary embodiment of the present disclosure refers to the cathode separator 100 forming the unit cell, the reaction surface external gasket 210 and the reaction surface internal gasket 220 which are formed by injection on the cathode separator 100, and the cooling surface gasket 230.

Of course, the separator unit for a fuel cell is not limited to being applied to the cathode separator 100 forming the unit cell, but may also be applied to the anode separator 300. In the following, however, for a preferable description, an example in which the separator unit for a fuel cell is applied to the cathode separator will be described.

Thus, the unit cell for a fuel cell according to the exemplary embodiment of the present disclosure includes the above-described separator unit.

To elaborate, the unit cell for a fuel cell according to the exemplary embodiment of the present disclosure includes: a membrane electrode assembly (MEA) 10; a sub-gasket 14 for surrounding and supporting an edge portion of the MEA 10; a pair of gas diffusion layers (GDL) 20 provided on each side of the MEA; a cathode separator 100 provided outside the GDL 20 and including a cathode reaction region through which reactant gas (air) flows formed on a surface facing the GDL 20; and an anode separator 300 provided outside the GDL 20 and including an anode reaction region through which reactant gas (hydrogen) flows formed on a surface facing the GDL 20.

The unit cell for a fuel cell according to the exemplary embodiment of the present disclosure further includes: a reaction surface internal gasket 220 formed on the cathode reaction surface of the cathode separator 100 and forming a reaction surface internal airtight line; a reaction surface external gasket 210 formed on the cathode reaction surface of the cathode separator 100 and forming a reaction surface external airtight line; and a cooling surface gasket 230 formed on the cathode cooling surface of the cathode separator 100 and forming a cooling surface airtight line.

Here, the membrane electrode assembly 10, the sub-gasket 14, the gas diffusion layer 20, the cathode separator 100, and the anode separator 300 maintain the structures of the membrane electrode assembly, the sub-gasket, the gas diffusion layer, the anode separator, and the cathode separator forming the conventional fuel cell stack shown in FIGS. 1 and 3 as they are.

However, a portion of the reaction surface external gasket 210 which is injected to form the external airtight line on the cathode separator 100 is removed.

To elaborate, the cathode separator 100 is provided outside the gas diffusion layer 20 provided on one surface which is the cathode side of the membrane electrode assembly 10. A cathode reaction region is formed in the center, and a plurality of cathode manifolds 101 to 106 through which reactant gas or cooling water is introduced or discharged are formed on both sides of the cathode reaction region. Here, the cathode reaction surface through which air flows is formed on a surface facing the gas diffusion layer 20, and the cathode cooling surface through which cooling water flows is formed on a surface opposite to the surface facing the gas diffusion layer 20.

Furthermore, the cathode separator 100 has a channel hole 120 through which air is introduced or discharged is formed between the manifolds 103 and 106 through which air is introduced or discharged and the cathode reaction region 110.

In the same context, the anode separator 300 is provided outside the gas diffusion layer 20 provided on the other surface which is the anode side of the membrane electrode assembly 10. An anode reaction region is formed in the center, and a plurality of anode manifolds 101 to 106 through which reactant gas or cooling water is introduced or discharged are formed on both sides of the anode reaction region. Here, the anode reaction surface through which hydrogen flows is formed on a surface facing the gas diffusion layer 20, and the anode cooling surface through which cooling water flows is formed on a surface opposite to the surface facing the gas diffusion layer 20.

Furthermore, the reaction surface internal gasket 220 is formed on the cathode reaction surface of the cathode separator 100, surrounds the cathode reaction region 110, and is in contact with the sub-gasket 14 to form the reaction surface internal airtight line while securing a path through which the reactant gas is introduced or discharged.

The reaction surface external gasket 210 is also formed on the cathode reaction surface of the cathode separator 100, and forms the reaction surface external airtight line between the cathode separator and the anode separator 300 while surrounding the reaction surface internal gasket 220 and the plurality of cathode manifolds 101 to 106.

Here, at least one cut portion 211 generated by removing the reaction surface external gasket 210 at a predetermined portion is formed in the reaction surface external airtight line.

The cooling surface gasket 230 is formed on the cathode cooling surface of the cathode separator 100, surrounds the region corresponding to the cathode reaction region 110, and surrounds the plurality of cathode manifolds 101 to 106 to form the cooling surface airtight line while securing a path through which cooling water is introduced or discharged.

In the exemplary embodiment of the present disclosure, the form of the reaction surface internal airtight line, the reaction surface external airtight line, and the cooling surface airtight line formed in the conventional dual gasket type separator is maintained as it is. As described above, however, it is characterized in that at least one cut portion 211 is formed in the reaction surface external airtight line. Therefore, the overlapping description will be omitted and the reaction surface external airtight line will be described in detail.

As shown in FIG. 6, the cut portion formed in the external airtight line is preferably formed by completely removing the reaction surface external gasket 210 in a predetermined portion so that unreacted reactant gas and generated water may be smoothly discharged. Due to the presence of the cut portion 211, the space between the airtight line inside the reaction surface and the airtight line outside the reaction surface is not closed, and the space between the reaction surface internal airtight line and the reaction surface external airtight line communicates with the cathode manifolds 101 and 104 at the point where the cut portion 211 is formed.

The cut portion 211 is preferably formed in the lower region, based on the direction of gravity, of the reaction surface external airtight line surrounding the manifold through which the reactant gas is introduced or discharged.

The cut portion 211 is preferably formed in the reaction surface external airtight line surrounding the cathode manifolds 101 and 104 through which hydrogen is introduced or discharged among the plurality of cathode manifolds 101 to 106. For example, the cut portion 211 includes an inlet cut portion 211a formed in the reaction surface external airtight line surrounding the cathode manifold 101 into which hydrogen is introduced among the plurality of cathode manifolds 101 to 106 and an outlet cut portion 211b formed in the reaction surface external airtight line surrounding the cathode manifold 104 into which hydrogen is discharged among the plurality of cathode manifolds 101 to 106.

The reason for forming the cut portion 211 in the reaction surface external airtight line surrounding the cathode manifolds 101 and 104 into which hydrogen is introduced or discharged among the plurality of cathode manifolds 101 to 106 is that, when the cut portion 211 is formed in the reaction surface external airtight line surrounding the cathode manifolds 103 and 106 through which air is introduced or discharged, air flowing to the cathode reaction surface and hydrogen flowing to the anode reaction surface may be directly contacted and reacted.

Of course, when the reaction surface external gasket is applied to the anode separator, it will be preferable that the cut portion be formed in the reaction surface external airtight line surrounding the anode manifolds through which air is introduced or discharged among the plurality of anode manifolds.

Also, the cut portion 211 is preferably formed at a point where, in the reaction surface external airtight line, the cooling surface gasket 230 is not formed is projected.

The reason for forming the cut portion 211 at the point where the cooling surface gasket 230 is not formed is projected in the instant way is to maintain uniform surface pressure between adjacent unit cells when stacking unit cells for a fuel cell.

Meanwhile, the cut portion formed in the external airtight line may be generated by removing only a portion of the reaction surface external gasket without completely removing it at a predetermined portion.

Figure 7:
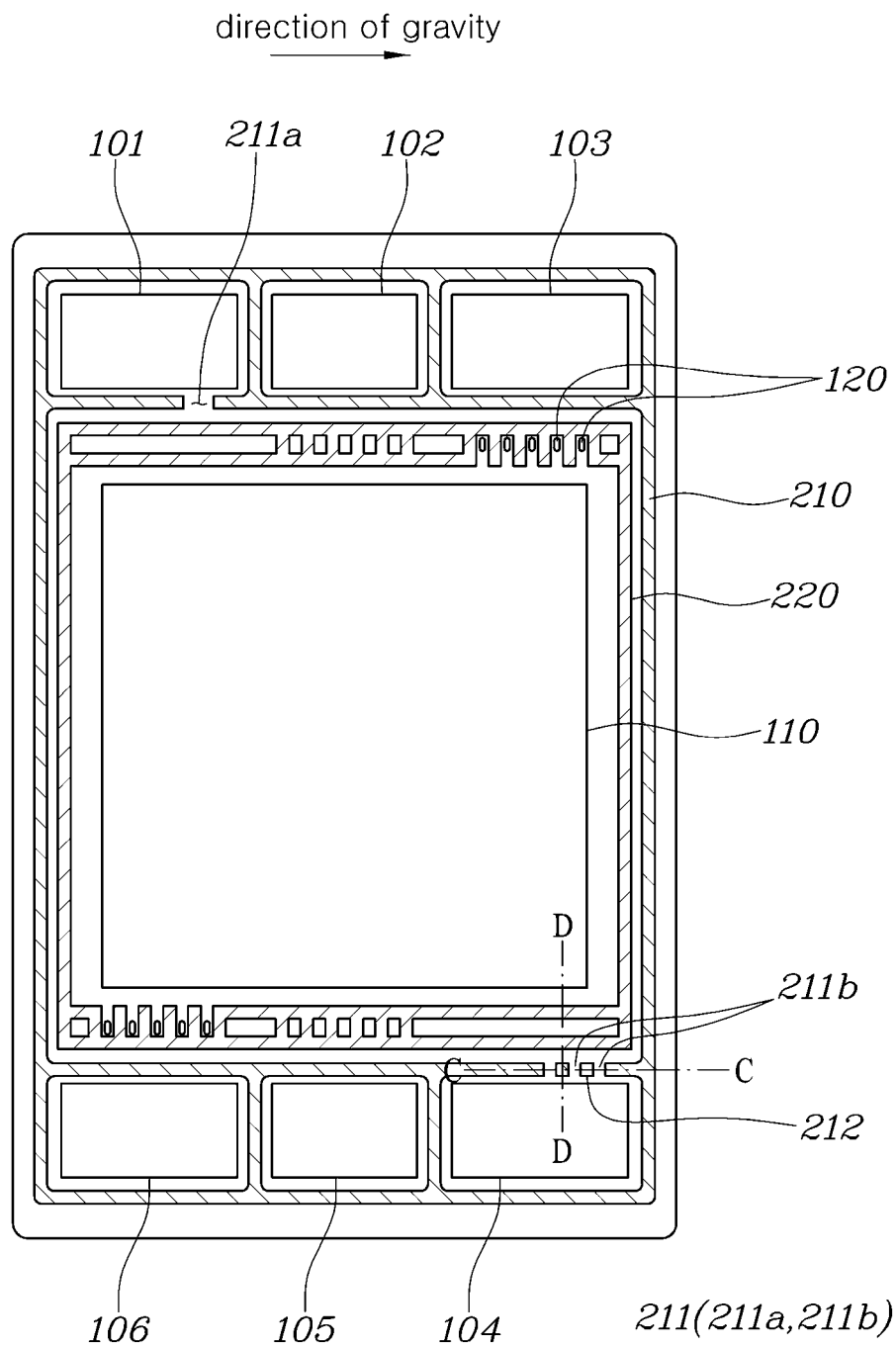
FIG. 7 is a view showing a reaction surface of a separator unit for a fuel cell according to various exemplary embodiments of the present disclosure.
Figure 9:
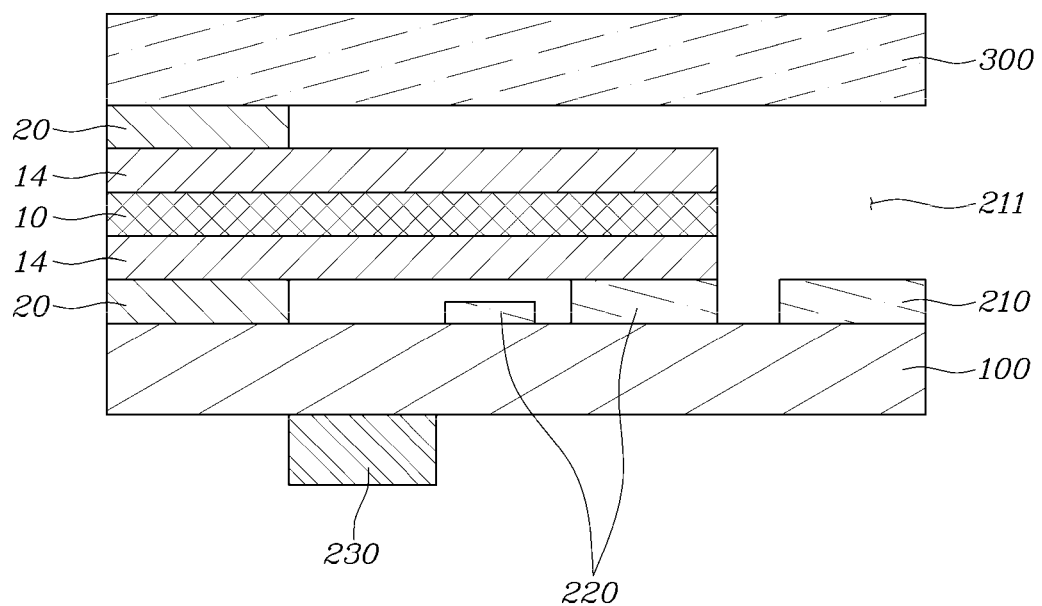
FIG. 9 is a view showing the stacked state of the unit cells along the line D-D of FIG. 7 in the reaction surface of the separator unit for a fuel cell according to various exemplary embodiments of the present disclosure.

FIG. 9 is a view showing the stacked state of the unit cells along the line D-D of FIG. 7 in the reaction surface of the separator unit for a fuel cell according to various exemplary embodiments of the present disclosure.

As shown in FIG. 9, the cut portion may be formed by removing a portion of the reaction surface external gasket 210 at a predetermined point of the reaction surface external airtight line.

In other words, the cut portion 211 is formed while a portion of the reaction surface external gasket 210 remains at a predetermined point of the reaction surface external airtight line.

The reason why a portion of the reaction surface external gasket 210 remains at a predetermined point of the reaction surface external airtight line where the cut portion 211 is formed is to facilitate injection of the reaction surface external gasket 210.

However, even if a portion of the reaction surface external gasket 210 remains at a predetermined point of the reaction surface external airtight line where the cut portion 211 is formed, the lower the height of the remaining reaction surface external gasket 210 is, the better. That is, it is preferable to increase the cross-sectional area of the cut portion 211 relatively.

Therefore, the cut portion 211 is formed to be greater than ½ of the gap between the cathode reaction surface of the cathode separator 100 and the anode reaction surface of the anode separator 30.

Meanwhile, a plurality of cut portions may be formed by being spaced from each other at a predetermined point of the reaction surface external airtight line.

Figure 8A:
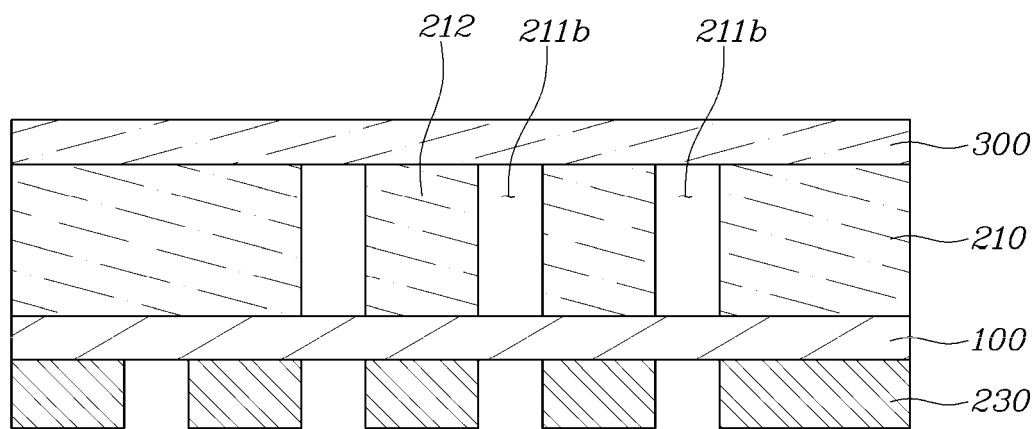
FIG. 8A is a view showing the stacked state of the unit cells along the line C-C of FIG. 7 in the reaction surface of the separator unit for a fuel cell according to various exemplary embodiments of the present disclosure.
Figure 8B:
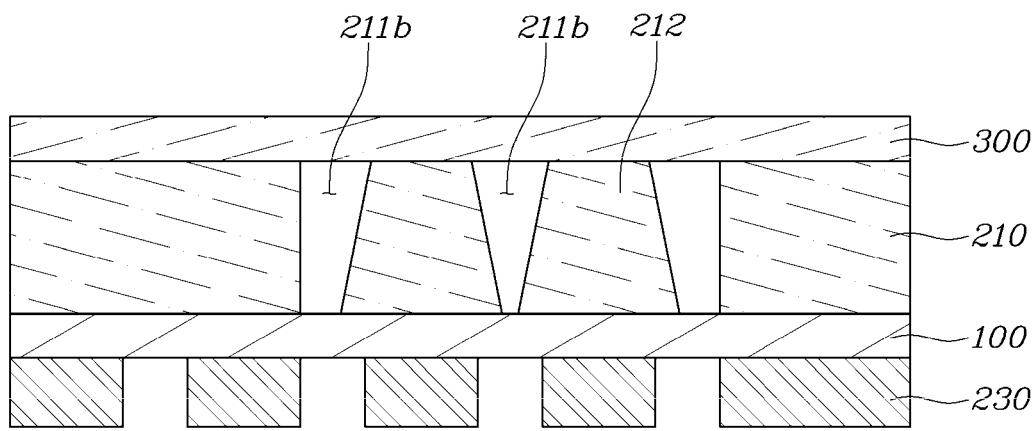
FIG. 8B is a view showing the stacked state of the unit cells along the line C-C of FIG. 7 in the reaction surface of the separator unit for a fuel cell according to a modified example of the present disclosure.

FIG. 7 is a view showing a reaction surface of a separator unit for a fuel cell according to various exemplary embodiments of the present disclosure, FIG. 8A is a view showing the stacked state of the unit cells along the line C-C of FIG. 7 in the reaction surface of the separator unit for a fuel cell according to various exemplary embodiments of the present disclosure, and FIG. 8B is a view showing the stacked state of the unit cells along the line C-C of FIG. 7 in the reaction surface of the separator unit for a fuel cell according to a modified example of the present disclosure.

As shown in FIG. 7, a plurality of cut portions 211 are formed, and a gasket island portion 212 is formed on the reaction surface external airtight line by the formation of the plurality of cut portions 211.

Securing a wide area in which the cut portion 211 is formed allows the unreacted reactant gas and generated water remaining between the external airtight line and the internal airtight line to escape smoothly.

However, when the area in which the cut portion 211 is formed becomes too large, the surface pressure becomes non-uniform in the corresponding area, and the shapes of the cathode separator 100 and the anode separator 300 may be changed. Therefore, it is preferable to form the gasket island portion 212 between the cut portions 211.

Here, the gasket island portion 212 is formed at a point where the cooling surface gasket 230 is formed is projected in the reaction surface external airtight line. In the present way, it is possible to prevent the surface pressure from becoming non-uniform in the corresponding area when the unit cells are stacked.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A separator unit used in a unit cell for a fuel cell, the separator unit comprising:
    a separator including a reaction region formed in a center portion thereof, a plurality of manifolds formed on each side of the reaction region through which reactant gas or cooling water is introduced or discharged, and a reaction surface formed on a first surface thereof and a cooling surface formed on a second surface thereof;
    a reaction surface internal gasket formed on the reaction surface of the separator, and surrounding the reaction region and forming a reaction surface internal airtight line while securing a path through which the reactant gas is introduced or discharged; and
    a reaction surface external gasket formed on the reaction surface of the separator, surrounding the reaction surface internal gasket while being spaced apart, and at the same time, surrounding the plurality of manifolds, and forming a reaction surface external airtight line while surrounding the reaction surface internal gasket and the plurality of manifolds,
    wherein at least one cut portion formed by removing the reaction surface external gasket is on a portion of the reaction surface external airtight line surrounding at least one of the plurality of manifolds, and wherein at points corresponding to a manifold into which the reactant gas is introduced or a manifold out of which the reactant gas is discharged among the plurality of manifolds, at least a portion of the reaction surface external gasket is removed, for forming the at least one cut portion.

2. The separator unit of claim 1, wherein the at least a cut portion is formed in the reaction surface external airtight line surrounding the manifold through which the reactant gas is introduced or discharged among the plurality of manifolds.

3. The separator unit of claim 2, wherein the at least a cut portion is formed in a lower region, based on a direction of gravity, of the reaction surface external airtight line surrounding the manifold through which the reactant gas is introduced or discharged.

4. The separator unit of claim 1, wherein the at least a cut portion is formed by completely removing the reaction surface external gasket at a predetermined point in the reaction surface external airtight line,
    wherein the predetermined point is formed in the lower region, based on a direction of gravity, of the reaction surface external airtight line surrounding the manifold through which the reactant gas is introduced or discharged.

5. The separator unit of claim 1,
    wherein the at least a cut portion is formed by removing a portion of the reaction surface external gasket at a predetermined point in the reaction surface external airtight line, and
    wherein the predetermined point is formed in the lower region, based on a direction of gravity, of the reaction surface external airtight line surrounding the manifold through which the reactant gas is introduced or discharged.

6. The separator unit of claim 1, further including:
a cooling surface gasket formed on the cooling surface of the separator, surrounding a region corresponding to the reaction region and the plurality of manifolds, and forming a cooling surface airtight line while securing a path through which the cooling water is introduced or discharged.

7. The separator unit of claim 6, wherein the at least a cut portion is formed at a point where, in the reaction surface external airtight line, the cooling surface gasket is not formed is projected.

8. The separator unit of claim 1, wherein a membrane electrode assembly and a sub-gasket for surrounding and supporting an edge portion of the membrane electrode assembly are provided on the reaction region of the separator, and the reaction surface internal gasket is in contact with the sub-gasket to form the reaction surface internal airtight line.

9. The separator unit of claim 1, wherein the at least one cut portion includes:
an inlet cut portion formed in the reaction surface external airtight line surrounding a manifold into which hydrogen is introduced among the plurality of cathode manifolds; and
an outlet cut portion formed in the reaction surface external airtight line surrounding the manifold into which the hydrogen is discharged among the plurality of cathode manifolds.

10. A unit cell for a fuel cell, the unit cell comprising:
a membrane electrode assembly (MEA);
a pair of gas diffusion layers (GDL) provided on each side of the MEA;
a cathode separator provided outside the GDL provided on a first surface of the MEA, including a cathode reaction region formed in a center portion thereof, including a plurality of manifolds formed on each side of the cathode reaction region through which reactant gas or cooling water is introduced or discharged, and including a cathode reaction surface through which air flows formed on a surface facing the GDL and a cathode cooling surface through which cooling water flows formed on a surface opposite to the surface facing the GDL;
an anode separator provided outside the GDL provided on a second surface of the MEA, including an anode reaction region formed in a center portion thereof, including a plurality of manifolds formed on each side of the anode reaction region through which reactant gas or cooling water is introduced or discharged, and including an anode reaction surface through which hydrogen flows formed on a surface facing the GDL and an anode cooling surface through which cooling water flows formed on a surface opposite to the surface facing the GDL;
a reaction surface internal gasket formed on the cathode reaction surface of the cathode separator, and surrounding the cathode reaction region and forming a reaction surface internal airtight line while securing a path through which the reactant gas is introduced or discharged; and
a reaction surface external gasket formed on the cathode reaction surface of the cathode separator, and forming a reaction surface external airtight line between the cathode separator and the anode separator while surrounding the reaction surface internal gasket and the plurality of manifolds,
wherein at least one cut portion formed by removing the reaction surface external gasket is on a portion of the reaction surface external airtight line surrounding at least one of the plurality of manifolds.

11. The unit cell of claim 10, wherein the at least a cut portion is formed in the reaction surface external airtight line surrounding a manifold through which hydrogen is introduced or discharged among the plurality of manifolds.

12. The unit cell of claim 11, wherein the at least a cut portion is formed in a lower region, based on a direction of gravity, of the reaction surface external airtight line surrounding the manifold through which the hydrogen is introduced or discharged.

13. The unit cell of claim 10,
wherein the at least a cut portion is formed by completely removing the reaction surface external gasket at a predetermined point in the reaction surface external airtight line, and
wherein the predetermined point is formed in the lower region, based on a direction of gravity, of the reaction surface external airtight line surrounding the manifold through which the reactant gas is introduced or discharged.

14. The unit cell of claim 10,
wherein the at least a cut portion is formed by removing a portion of the reaction surface external gasket at a predetermined point in the reaction surface external airtight line, and
wherein the predetermined point is formed in the lower region, based on a direction of gravity, of the reaction surface external airtight line surrounding the manifold through which the reactant gas is introduced or discharged.

15. The unit cell of claim 14, wherein the at least a cut portion is formed to be greater than ½ of a gap between the cathode reaction surface of the cathode separator and the anode reaction surface of the anode separator.

16. The unit cell of claim 10, further including:
a cooling surface gasket formed on the cathode cooling surface of the cathode separator, surrounding a region corresponding to the cathode reaction region and the plurality of manifolds, and forming a cooling surface airtight line while securing a path through which the cooling water is introduced or discharged.

17. The unit cell of claim 16, wherein the at least a cut portion is formed at a point where, in the reaction surface external airtight line, the cooling surface gasket is not formed is projected.

18. The unit cell of claim 16, wherein a plurality of cut portions are formed, and a gasket island portion is formed in the reaction surface external airtight line by a formation of the plurality of cut portions,
wherein the gasket island portion is formed at a point where, in the reaction surface external airtight line, the cooling surface gasket is formed is projected.

19. The unit cell of claim 10, further including:
a sub-gasket surrounding and supporting an edge portion of the MEA,
wherein the reaction surface internal gasket is in contact with the sub-gasket to form the reaction surface internal airtight line.

20. The unit cell of claim 10, wherein the at least one cut portion includes:
an inlet cut portion formed in the reaction surface external airtight line surrounding a manifold into which hydrogen is introduced among the plurality of manifolds; and an outlet cut portion formed in the reaction surface external airtight line surrounding the manifold into which the hydrogen is discharged among the plurality of manifolds.

* * * * *